US007946761B2

(12) United States Patent
Li

(10) Patent No.: US 7,946,761 B2
(45) Date of Patent: May 24, 2011

(54) SHRINKABLE DISPENSING CONTAINER FOR PROBE COVERS

(75) Inventor: Liang-Yi Li, Hsinchu (TW)

(73) Assignee: Actherm Inc., Hsinchu (TW)

( * ) Notice: Subject to any disclaimer, the term of this patent is extended or adjusted under 35 U.S.C. 154(b) by 532 days.

(21) Appl. No.: 12/185,856

(22) Filed: Aug. 5, 2008

(65) Prior Publication Data

US 2009/0122836 A1    May 14, 2009

(30) Foreign Application Priority Data

Nov. 8, 2007  (TW) ................. 96142168 A

(51) Int. Cl.
*G01K 1/08* (2006.01)
*B65H 1/00* (2006.01)
(52) U.S. Cl. ........ 374/158; 374/209; 374/141; 374/121; 221/198; 221/112; 600/184
(58) Field of Classification Search .............. 374/100, 374/141, 120, 121, 158, 209; 600/184, 474, 600/549; 221/221, 226, 228, 229, 175, 190, 221/198; D10/57
See application file for complete search history.

(56) References Cited

U.S. PATENT DOCUMENTS

| | | | |
|---|---|---|---|
| 4,497,585 A * | 2/1985 | Paull et al. ..................... 374/158 |
| 4,993,424 A | 2/1991 | Suszynski et al. |
| 5,100,018 A * | 3/1992 | Rosati et al. ..................... 221/6 |
| 6,186,959 B1 * | 2/2001 | Canfield et al. ............... 600/559 |
| 6,347,243 B1 * | 2/2002 | Fraden .......................... 600/474 |
| 6,840,402 B2 * | 1/2005 | Lin et al. ........................ 221/198 |
| 7,686,506 B2 * | 3/2010 | Babkes et al. ................. 374/158 |
| 2010/0133291 A1 * | 6/2010 | Yu .................................... 221/97 |
| 2010/0147719 A1 * | 6/2010 | Li .................................. 206/438 |
| 2010/0147720 A1 * | 6/2010 | Li .................................. 206/438 |

* cited by examiner

*Primary Examiner* — Gail Verbitsky
(74) *Attorney, Agent, or Firm* — Ming Chow; Sinorica, LLC

(57) ABSTRACT

This invention relates to a shrinkable dispensing container for probe covers of an ear thermometer. Therein, the ear thermometer probe cover refers to a product having a hollow body and a flange. The dispensing container for probe covers of an ear thermometer comprises a main body for accommodating a plurality of stacked probe covers and an access opening formed at one end of the main body for allowing an ear thermometer probe to insert into the probe cover in the main body. The present invention is characterized by a bottom portion formed at another end of the main body opposite to the access opening for supporting all the probe covers stacked within the main body. The main body is primarily composed of a plurality of member portions wherein each of the member portions comprises at last a bending portion so that when the member portion receives a compressing force acting along a lengthwise direction thereof, the bending portion is bent and contracted accordingly, and thereby causes the main body to be shrunk along a lengthwise direction thereof. An abutting component is disposed in the main body adjacent to the access opening to abut against the annular flange of the probe cover for preventing the probe cover from falling when there is no force acting on the probe covers of an ear thermometer.

17 Claims, 8 Drawing Sheets

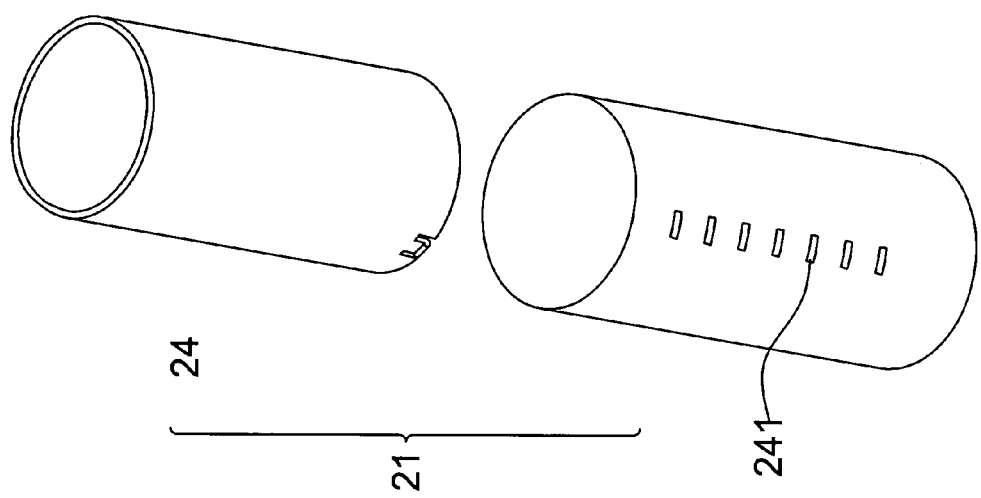

SHRINKABLE DISPENSING CONTAINER FOR PROBE COVERS

BACKGROUND OF THE INVENTION

1. Technical Field

The present invention relates to a shrinkable dispensing container for probe covers of an ear thermometer. More particularly, the present invention provides a shrinkable dispensing container for facilitating dispensing a probe cover to be assembled onto an ear thermometer probe in such a way that the probe covers are prevented from necessary external contact.

2. Description of Related Art

When using a conventional dispensing container for probe covers of an ear thermometer, a user or medical staffer has to take out the probe cover from the dispensing container and assemble the probe cover to the ear thermometer with direct contact between his hand and the probe cover, thereby resulting in inconvenient use of the conventional dispensing container. Infrared ear thermometers particularly need probe covers to prevent infection and maintain cleanness of the measuring probes thereof. In the known technical field, automatically feeding mechanisms, such as those disclosed in U.S. Pat. No. 4,993,424, U.S. Pat. No. 5,100,018 and U.S. Pat. No. 6,840,402, have been implemented for assembling a probe cover onto an ear thermometer probe. Though such products have been employed in hospital, inconvenient use of dispensing or assembling probe covers from the feeding mechanisms caused by the complicated configurations and bulkiness thereof is still a problem. Besides, a commercially available packing carton for probe covers of an ear thermometer manufactured by Braun GmbH, a German manufacturer, allows a thermometer to insert the side thereof to grab a probe cover. However, in such case, the side of the packing carton has to be rent, rendering the packing carton becoming incomplete and the probe covers exposing to the external environment. As a result, the possibility where the users' hands or other external objects get into direct contact with the probe covers may risk the probe covers in contamination. Moreover, such approach brings restriction on the shapes and dimensions of the compatible ear thermometer probes.

Therefore, it is obvious that the conventional dispensing containers for probe covers of an ear thermometer substantially bring the users or medical staff inconvenience and trouble. Hence, there is a need for a convenient and efficient dispensing container for probe covers of an ear thermometer that facilitates medical staff's use and prevents medical staff from contacting the probe covers of an ear thermometer directly.

SUMMARY OF THE INVENTION

In the attempt to remedy the problems of the prior arts, the present invention provides a shrinkable dispensing container for probe covers of an ear thermometer. Therein, the ear thermometer probe cover refers to a product having a hollow body and an annular flange. The shrinkable dispensing container for probe covers comprises a main body for accommodating a plurality of probe covers stacked within the main body and an access opening formed at one end of the main body for allowing an ear thermometer probe to insert into the upmost probe cover in the main body. The present invention is characterized by a bottom portion 13 formed at another end of the main body opposite to the access opening for supporting all the probe covers stacked within the main body. The main body is primarily composed of a plurality of member portions wherein each said member portion comprises at last a bending portion so that when the member portions receive a compressing force acting along a lengthwise direction thereof, the bending portions are bent accordingly, thereby causing the main body to be shrunk along a lengthwise direction thereof. A abutting component is disposed in the main body adjacent to the access opening to abut on the annular flange of the probe cover for preventing the probe cover from falling out when there is no force acting on the probe covers.

It is one objective of the present invention to provide a shrinkable dispensing container for probe covers that has at least one end thereof capable of being opened for allowing an ear thermometer probe to insert therethrough for being assembled with one of the probe covers so as to prevent the probe cover from falling out when there is no force acting on the probe covers.

It is another objective of the present invention to provide a dispensing container for probe covers of an ear thermometer that is shrinkable so as to prevent the probe covers from being contacted directly by users when one of the probe covers is to be assembled with an ear thermometer probe.

It is another objective of the present invention to provide a shrinkable dispensing container for probe covers of an ear thermometer that comprises a abutting component disposed on the dispensing container adjacent to an access opening thereof in order to prevent the probe covers from falling out from the dispensing container when the probe covers are moved or reversely placed.

It is another objective of the present invention to provide a shrinkable dispensing container for probe covers of an ear thermometer that comprise a abutting component disposed on the dispensing container adjacent to an access opening thereof in order to prevent an ear thermometer probe cover next to the one being assembled currently from being tugged out simultaneously.

It is another objective of the present invention to provide a shrinkable dispensing container for probe covers of an ear thermometer that can maintain a shrunk state after being shrunk so as to efficiently position the probe covers and prevent disorder of the probe covers in the dispensing container.

It is yet another objective of the present invention to provide a shrinkable dispensing container for probe covers of an ear thermometer that comprises a cover for being closed when the shrinkable dispensing container is not in use so as to efficiently protect the probe covers from contamination.

BRIEF DESCRIPTION OF THE DRAWINGS

The invention as well as a preferred mode of use, further objectives and advantages thereof, will best be understood by reference to the following detailed description of an illustrative embodiment when read in conjunction with the accompanying drawings, wherein:

FIG. 2A is an exploded view of a shrinkable dispensing container for probe covers according to a second embodiment of the present invention;

DETAILED DESCRIPTION OF THE PREFERRED EMBODIMENT

While the present invention discloses a dispensing container for probe covers of an ear thermometer, it is to be stated first of all that the basic principle where the ear thermometer operates upon have been familiar to people skilled in the art and need not be discussed at length herein. Meantime, while the accompanying drawings are provided for the purpose of illustration, it is to be understood that the drawings are directed to the characteristics of the present invention and need not to be made in scale.

Figure 1A:
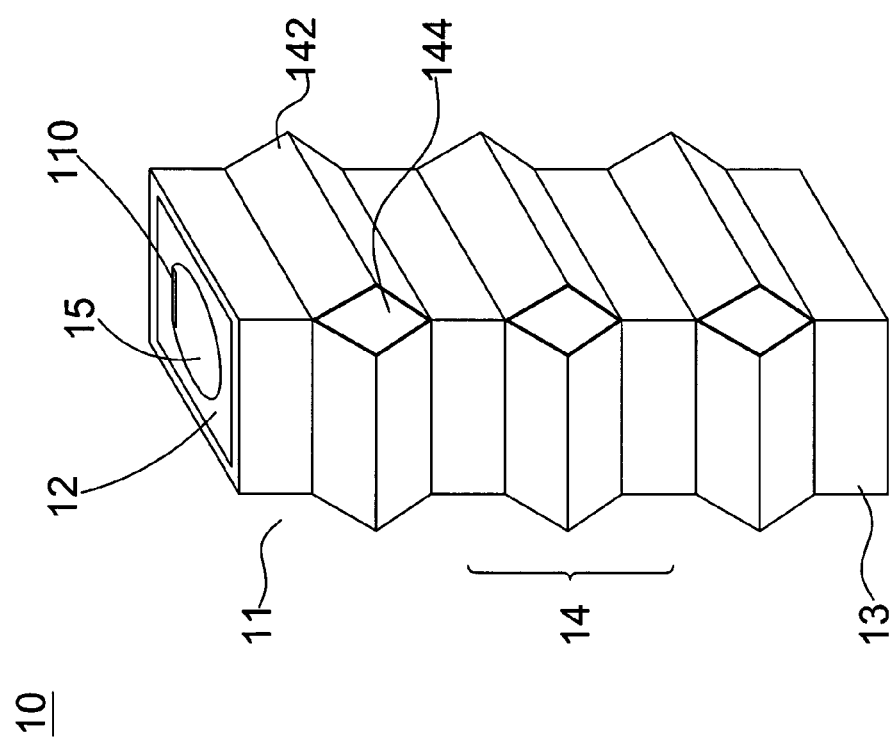
FIG. 1A is a perspective view of a shrinkable dispensing container for probe covers of an ear thermometer according to a first embodiment of the present invention.
Figure 1B:
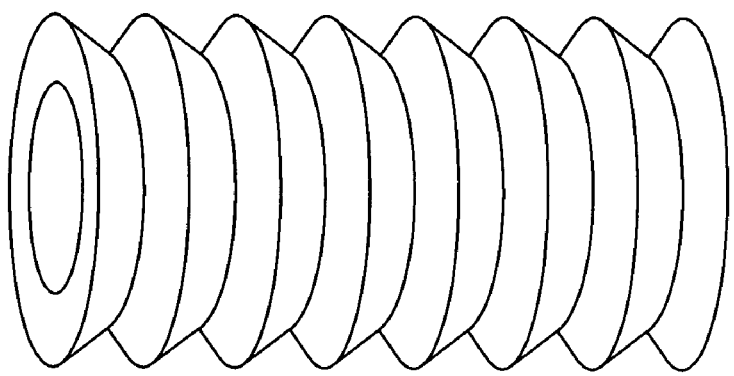
FIG. 1B is a perspective view of a shrinkable dispensing container for probe covers according to another embodiment of the present invention.
Figure 1C:
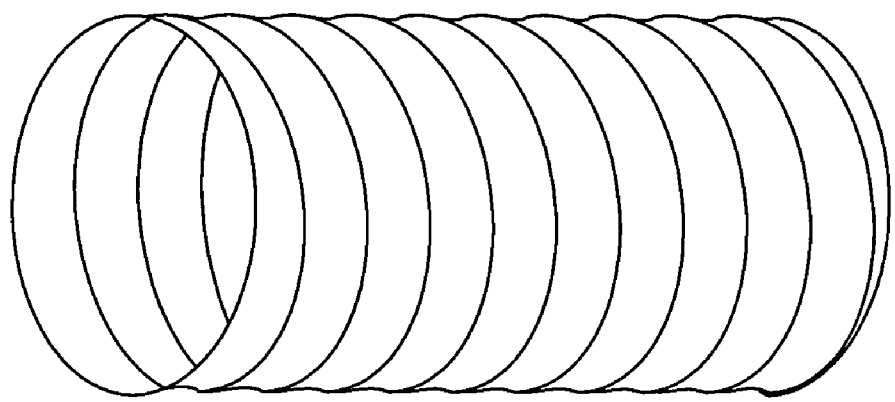
FIG. 1C is a perspective view of a shrinkable dispensing container for probe covers according to yet another embodiment of the present invention.

Please refer to FIG. 1A for a shrinkable dispensing container 10 of a first embodiment of the present invention. A plurality of probe covers 15 are disposed in the dispensing container 10, in which each of the probe covers 15 has a hollow body (not shown) and an annular flange (not shown). The shrinkable dispensing container 10 comprises a main body 11 for accommodating the plurality of probe covers stacked together and an access opening 12 is formed at one end of the shrinkable dispensing container 10 for allowing an ear thermometer probe to insert into the probe cover 15 positioned upmostly in the main body 11. In the present embodiment, a bottom portion 13 is formed at another end of the main body 11 opposite to the access opening 12 for supporting all the probe covers 15 stacked within the main body 11. The main body 11 is primarily composed of a plurality of member portions 14 and each member portion 14 can be a round, rectangular, triangular, trapezoid, or polygonal sectional shape. Each member portion 14 comprises at last a bending portion 142. The bending portions 142 may be configured to be separated from each other to form the main body 11 as a hollow rectangular configuration as shown in FIG. 1A or may be connected to each other to form the main body 11 as a lantern type as shown in FIG. 1B or a screwed shape as shown in FIG. 1C. In any of the above configurations of the bending portion 142, it possesses the feature of being compressed without bounce to make the main body 11 shrinkable along a lengthwise direction thereof when the member portion 14 receives a compressing force acting along a lengthwise direction thereof. Furthermore, a abutting component 110 disposed in the main body 11 adjacent to the access opening 12 to abuts on the annular flange of the upmost probe cover in the main body 11 for preventing the probe cover from falling out from the dispensing container 10 when there is no force acting on the shrinkable dispensing container 10.

In the aforementioned embodiment, if the bending portion 142 of each member portion 14 is configured as being separated from each other, then a side opening 144 is further provided at each side of the bending portion 142 so that when the member portion 14 receives an external force, it expends outward as shown in FIG. 1A. Besides, the member portions 14 may be combined mutually by means of adhering, sealing or fusing to form the shrinkable dispensing container 10.

Moreover, to achieve flexibility, the main body 11 may be made of paper or plastic. Besides, for ensuring that inner sides of the dispensing container 10 can firmly hold the flange of the probe cover 15 contained therein, the main body 11 may be configured to have the inner side tangent to the flange of the probe cover. Therefore, when the probe cover 15 is placed in the dispensing container 10, since a radius of the flange is greater than a distance between a center of the flange and at least one side of the main body 11 not tangent to the flange, the side of the main body 11 not tangent to the flange can be hunched outward to become tangent to the flange in virtue of the flexibility thereof, so as to prevent the probe cover 15 from falling out from the dispensing container 10. In addition, the disclosed dispensing container 10 may further comprises an upper cover 16 (not shown) for covering the probe covers 15 in the dispensing container 10 so as to protect the probe covers 15 from direct external contact that leads to contamination.

Figure 2B:
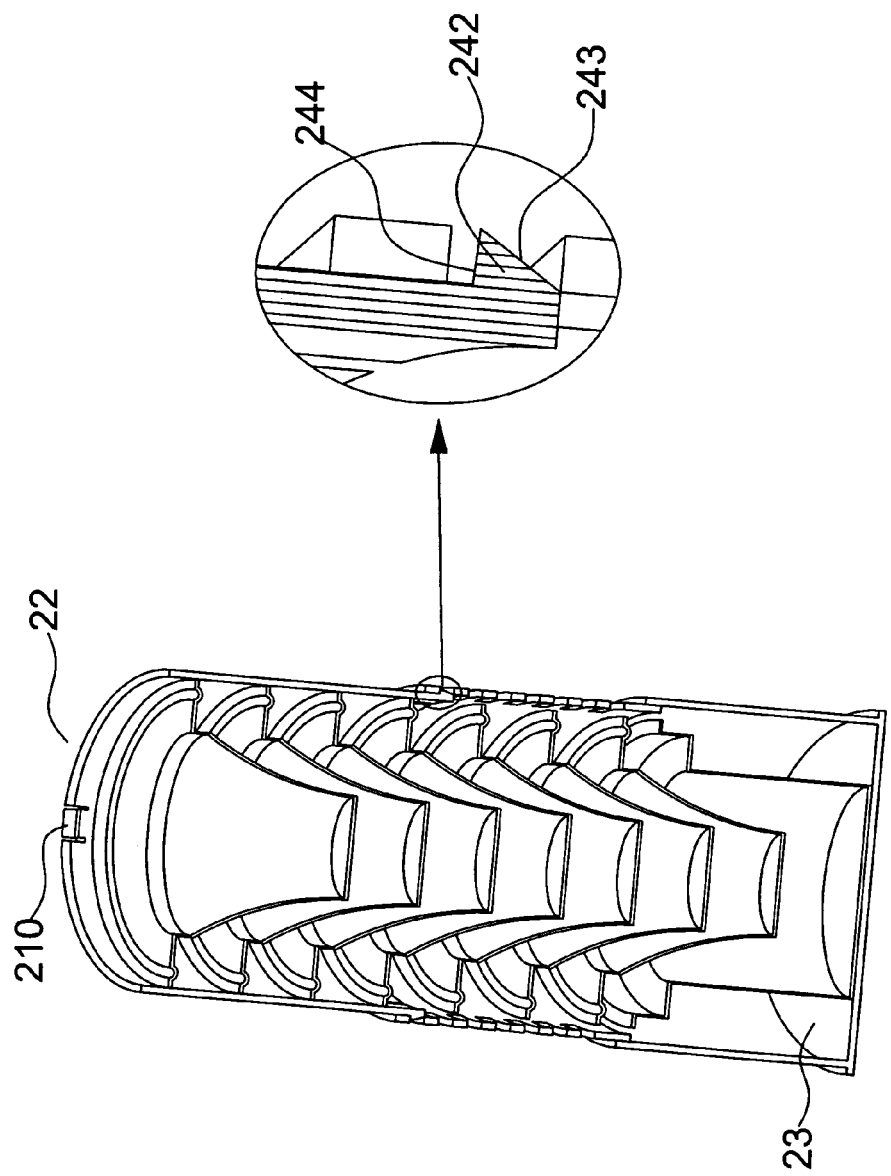
FIG. 2B is a sectional view of the shrinkable dispensing container for probe covers to the second embodiment of the present invention.
Figure 2C:
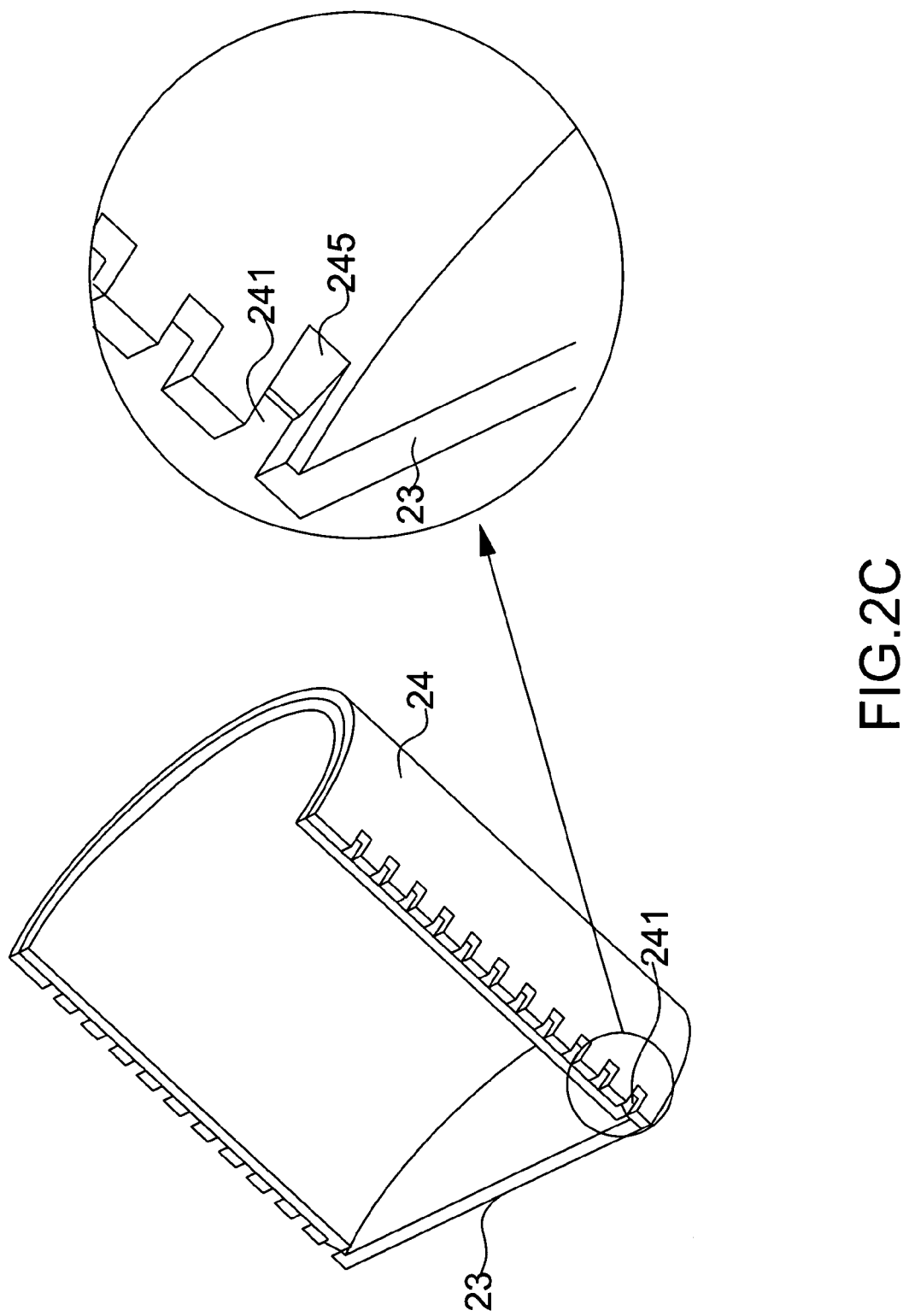
FIG. 2C is a schematic drawing of the shrinkable dispensing container for probe covers according to the second embodiment of the present invention.
Figure 2D:
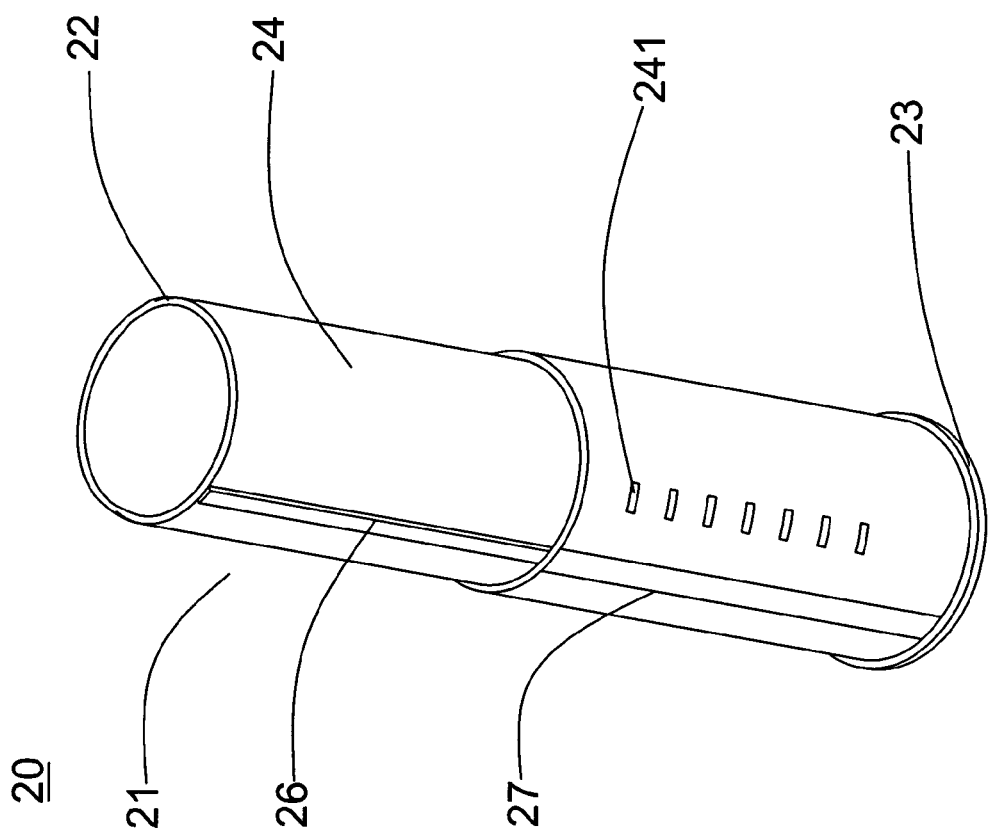
FIG. 2D is another schematic drawing of the shrinkable dispensing container for probe covers according to the second embodiment of the present invention.

Please refer to FIGS. 2A and 2B for a shrinkable dispensing container 20 according to a second embodiment of the present invention. The shrinkable dispensing container 20 comprises a main body 21 for accommodating the plurality of probe covers stacked together (not shown). An access opening 22 is formed at one end of the shrinkable dispensing container 20 for allowing an ear thermometer probe to insert into the probe cover positioned upmostly in the main body 21. In the present embodiment, the main body 21 is primarily composed of a plurality of member portions 24 that are telescoped. Each member portion 24 has a group of concave portions 241 formed at one side thereof along a lengthwise direction thereof. Each of the concave portions 241 may be formed by means of hollowing out the member portion 24 from an inner wall through an outer wall of the member portion 24 or from the outer wall through the inner wall of the member portion 24. When the main body 21 receives a compressing force acting along a lengthwise direction thereof, the member portions 24 move correspondingly and get telescoped mutually. For example, one of the concave portions 241 on the outer member portion 24 can be engaged with a retaining portion 242 of the inner member portion so that both member portions 24 can be engaged and positioned mutually without loosing. For ensuring that only push-down without pull-up, a guiding surface 243 and an abutting surface 244 are provided in the retaining portion 242 such that they are exercised between the member portions 24. Thereby, the guiding surface 243 of the retaining portion 242 of the inner member portion can guide the outer member portion to smoothly slide into the concave portion 241 of the outer member portion 24. At this time, the abutting surface 244 of the inner member portion can just be engaged by the concave portion 241 of the outer member portion 24 so that the inner member portion 24 can be kept inside the outer member portion 24 for preventing reversely coming off from the outer member portion 24 so as to make the member portions 24 shrinkable and positioned without departing. In the present embodiment, each member portion 24 may have two groups of concave portions 241 formed at the side thereof along the lengthwise direction thereof such that the two groups of concave portions 241 are substantially formed at two ends of a diameter of the member portion 24, respectively. Although in the present embodiment the upper member portion (i.e. the inner member portion) has the diameter less than that of the lower member portion (i.e. the outer member portion), it is to be understood that the upper member portion (i.e. the outer member portion) with the diameter greater than that of the lower member portion (i.e. the inner member portion) may be also implemented to embody the present invention.

In the present invention, a bottom portion 23 is formed at another end of the main body 21 opposite to the access opening 22 for supporting all the probe covers stacked within the main body 21. Moreover, a abutting component 210 is disposed in the main body 21 adjacent to the access opening 22 to abut on the annular flange (not shown) of the ear thermometer probe cover for preventing any of the probe covers from falling out from the dispensing container when there is no force acting on the probe covers of an ear thermometer. The concave portions 241 may also be formed by means of hollowing out the member portion 24. Besides, from FIGS. 2A to 2D, it is learned that the number of the member portions 24 is two, while the preferred number is at least three. The member portion 24 may have a sectional shape of rectangle, triangle, trapezoid, or polygon, in addition to roundness. Besides, as described in the first embodiment, for ensuring that the dispensing container can firmly hold the flange of the probe cover contained therein, in the present embodiment, each of the member portions 24 may be configured to be a polygonal sectional shape (not shown) such that at least two sides thereof are tangent to the flange of the probe cover. Thereupon, when the probe cover (not shown) is placed in the dispensing container 20, since a radius of the flange is greater than a distance between a center of the flange and at least one side of the member portion 24 not tangent to the flange, the side of the member portion 24 not tangent to the flange can be hunched outward by the flange to become tangent to the flange in virtue of the flexibility of the main body, so as to prevent the probe cover from falling out from the dispensing container.

In the above embodiment, a ramp 245 may be further provided in the concave portion 241 adjacent to the bottom portion 23, as shown in 2C. The ramp 245 helps the retaining segment 242 coupled with the concave portion 241 to depart from the depressed segment 241 so as to disassemble each of the member portions. Please further refer to FIG. 2D. A track 26 may be further provided on the member portion adjacent to the access opening 22 and a groove 27 may be provided on the corresponding member portion so that when the member portions are assembled through the track 26 and the corresponding groove 27, the member portion with the track 26 may be more easily coupled with the corresponding member portion with the groove 27.

Figure 3:
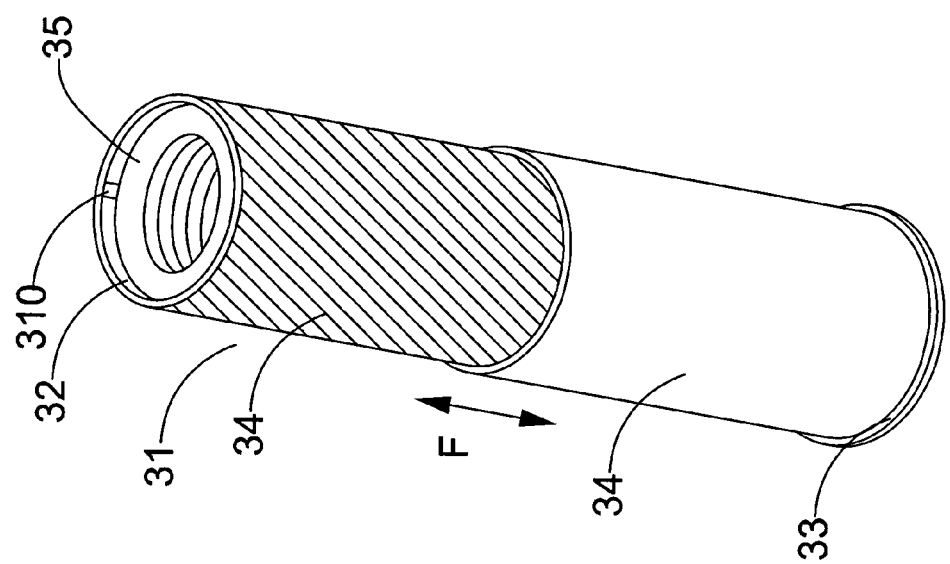
FIG. 3 is perspective view of a shrinkable dispensing container for probe covers according to a third embodiment of the present invention.

Please refer to FIG. 3 for a shrinkable dispensing container 30 of a third embodiment of the present invention. Therein, each of the probe covers 35 has a hollow body and an annular flange. The shrinkable dispensing container 30 comprises a main body 31 for accommodating the plurality of probe covers 35 stacked together and an access opening 32 formed at one end of the shrinkable dispensing container 30 for allowing an ear thermometer probe to insert into the probe cover 35 in the main body 31. Moreover, a bottom portion 33 is formed at another end of the main body 31 opposite to the access opening 32 for supporting all the probe covers 35 stacked within the main body 31. The main body 31 is primarily composed of a plurality of member portions 34 that are telescoped mutually. In the present embodiment, the number of the member portions 34 is two. Each of the member portions 34 has a specific rough surfaces so that when the main body 31 receives a compressing force acting along a lengthwise direction thereof, a friction F is generated due to the relative movement of the rough surfaces of two member portions 34 so that the inner member portion and the outer member portion can be assembled mutually and positioned with firmness in virtue of the friction F.

In the above embodiment, due to the rough surfaces of member portions 34, when a user takes out one of the probe covers 35 from the shrinkable dispensing container 30, the contact friction F between the member portions 34 is greater than a taking out force of the user so as to prevent the motion of taking out the probe cover 35 from lengthening the shrinkable dispensing container 30. Besides, the number of the member portions 34 is at least two while each of the member portions 34 may have a round, rectangular, triangular, trapezoid, or polygonal sectional shape. Moreover, as described in the first embodiment, for ensuring that the dispensing container 30 can firmly hold the flange of the ear thermometer probe cover contained therein, in the present embodiment, each of the member portions 34 may be configured with a polygonal sectional shape (not shown) such that at least two sides thereof are tangent to the flange. Thereupon, when the ear thermometer probe cover 35 is placed in the dispensing container 30, since a radius of the flange is originally greater than a distance between a center of the flange and at least one side of the member portion 34 not tangent to the flange, the side of the member portion 34 not tangent to the flange can be hunched outward by the flange to become tangent to the flange in virtue of the flexibility of the main body 31, so as to prevent the probe cover from falling out from the dispensing container 30. Similar to the first embodiment, in order to achieve flexibility, the main body 31 may be made of paper or plastic. Furthermore, a abutting component 310 is disposed in the main body 31 adjacent to the access opening 32 to abut on the annular flange of the upmost probe cover 35 for preventing the probe cover 35 from falling out from the dispensing container 30 when there is no force acting on the probe covers of an ear thermometer 35. In addition, the disclosed dispensing container 30 may further comprises an upper cover (not shown) for covering the probe covers 35 in the dispensing container 30 so as to protect the probe covers 35 from direct external contact that leads to contamination.

The present invention further provides a manufacturing method for the dispensing container for probe covers of an ear thermometer according to the first embodiment. The manufacturing method comprises: providing a main body 11 and a bottom portion 13, as shown in FIGS. 1A to 1C, wherein the main body 11 is primarily composed of a plurality of member portions 14 that may have a round, rectangular, triangular, trapezoid, or polygonal sectional shape and the bottom portion 13 is formed at another end of the main body 11 opposite to the access opening 22 for supporting all the probe covers 15 stacked within the main body 11, wherein each of the member portions 14 comprises at last a bending portion 142, which may be configured as being separated from each other or being connected to each other while the configurations and technical features of the main body 11 and the member portions 14 are the same as those described in the first embodiment.

The present invention further provides a manufacturing method for the dispensing container for probe covers of an ear thermometer according to the second embodiment. The manufacturing method comprises: providing a main body 21 and a bottom portion 23, as shown in FIGS. 2A to 2D, wherein the main body 21 is primarily composed of a plurality of member portions 24 that are telescoped, and each member portion 24 has a group of concave portions 241 formed at a side thereof along a lengthwise direction thereof. The concave portions 241 may be made by means of hollowing out the member portion 24 from an inner wall through an outer wall of the member portion 24 or from the outer wall through the inner wall of the member portion 24. Besides, the member portion 24 may have a round, rectangular, triangular, trapezoid, or polygonal sectional shape and the bottom portion 23 is formed at another end of the main body 21 opposite to the access opening 22 for supporting all the probe covers stacked within the main body 21. The configurations and technical features of the main body 21 and the member portions 24 are the same as those described in the second embodiment.

The present invention further provides a manufacturing method for the dispensing container for probe covers of an ear thermometer according to the third embodiment. The manufacturing method comprises: providing a main body 31 and a bottom portion 33, as shown in FIG. 3, wherein the main body 31 is primarily composed of a plurality of member portions 34 connected together, in which each member portion 34 has a specific rough surfaces so that when the main body 31 receives a compressing force acting along a lengthwise direction thereof, a friction F is generated due to the relative movement of the rough surfaces of two member portion 34 so that the inner member portion and the outer member portion can be assembled mutually and positioned with firmness in virtue of the friction F. Besides, each of the member portions 34 may have a round, rectangular, triangular, trapezoid, or polygonal sectional shape and the bottom portion 33 is formed at another end of the main body 31 opposite to the access opening 32 for supporting all the probe covers stacked within the main body 31. The configurations and technical features of the main body 31 and the member portions 34 are the same as those described in the third embodiment.

Although the particular embodiments of the invention have been described in detail for purposes of illustration, it will be understood by one of ordinary skill in the art that numerous variations will be possible to the disclosed embodiments without going outside the scope of the invention as disclosed in the claims.

What is claimed is:

1. A shrinkable dispensing container for probe covers of an ear thermometer of an ear thermometer, each of the probe covers of an ear thermometer having a hollow body and an annular flange and the shrinkable dispensing container comprises:
   a main body for accommodating the probe covers stacked together and an access opening formed at one end of the main body for allowing an ear thermometer probe of the ear thermometer to insert into an upmost probe cover among the probe covers in the main body;
   characterized in that:
   a bottom portion is formed at another end of the main body opposite to the access opening for supporting all the probe covers stacked within the main body; and
   the main body is primarily composed of a plurality of member portions connected together wherein each of the member portion comprises at last a bending portion so that when the member portions receive a compressing force acting along a lengthwise direction thereof, the bending portions are bent and contracted accordingly, thereby causing the main body to be shrunk along a lengthwise direction thereof.

2. The shrinkable dispensing container of claim 1, wherein the an abutting component is disposed in the main body adjacent to the access opening to abut on the annular flange of the upmost probe cover for preventing the probe covers from falling out of the shrinkable dispensing container.

3. The shrinkable dispensing container of claim 2, wherein the main body is flexible and possesses a feature of being compressed without bounce when the member portions receive a compressing force acting along the lengthwise direction thereof.

4. The shrinkable dispensing container of claim 3, wherein the bending portions are separated from each other and a side opening is further provided at each side of each of the bending portions so that the member portions expend transversely when the member portions receive the compressing force.

5. The shrinkable dispensing container of claim 3, wherein the bending portions are connected mutually to form a screwed shape.

6. The shrinkable dispensing container of claim 3, wherein each of the member portions has a sectional shape selected from the group consisting of roundness, rectangle, triangle, trapezoid, and polygon.

7. The shrinkable dispensing container of claim 1, further comprising an upper cover for protecting the probe covers of an ear thermometer from being contaminated.

8. The shrinkable dispensing container of claim 1, wherein the main body is such configured that inner sides thereof are tangent to the flange for ensuring that the dispensing container firmly hold the probe covers of an ear thermometer securely contained therein.

9. A shrinkable dispensing container for probe covers of an ear thermometer of an ear thermometer, each of the probe cover having a hollow body and an annular flange and the shrinkable dispensing container comprises:
   a main body for accommodating the probe covers stacked together and an access opening formed at one end of the main body for allowing an ear thermometer probe of the ear thermometer to insert into an upmost probe cover among the probe covers in the main body;
   characterized in that:
   a bottom portion is formed at another end of the main body opposite to the access opening for supporting all the probe covers stacked within the main body; and
   the main body is primarily composed of a plurality of member portions that are telescoped mutually, wherein the member section has a sidewall provided with at least a group of a plurality of concave portions along the lengthwise direction thereof and the corresponding member portion has a sidewall provided with at least a retaining portion so that when the member portions receive a compressing force acting along the lengthwise direction thereof, the two member portions are moved and telescoped inwardly so that one of the concave portion of the member portion is engaged with the retaining portion of the corresponding member portion.

10. The shrinkable dispensing container of claim 9, wherein an abutting component is disposed in the main body adjacent to the access opening to abut on the annular flange of the upmost probe cover for preventing the probe covers from falling out from the shrinkable dispensing container.

11. The shrinkable dispensing container of claim 10, wherein the member portion has two groups of concave portions formed at the side thereof along the lengthwise direction thereof such that the two groups of concave portions are substantially disposed on two ends of a diameter of the member portion, respectively.

12. The shrinkable dispensing container of claim 11, wherein each of the concave portions is formed from an inner wall through an outer wall of the member portion or from the outer wall through the inner wall of the member portion.

13. The shrinkable dispensing container of claim 12, wherein the retaining segment has a guiding surface for guiding the retaining portion to be smoothly coupled with the concave portion and further has an abutting surface for preventing the retaining portion from reverse separation from the concave portion so that when the main body receives the compressing force, only push-down, but not pull-up, can be exercised between the member portions.

14. The shrinkable dispensing container of claim 10, wherein the main body is such configured that inner sides thereof are tangent to the flange for ensuring that the dispensing container firmly holds the probe covers of an ear thermometer securely contained therein.

15. The shrinkable dispensing container of claim 13, wherein a ramp is further provided in the concave portion adjacent to the bottom portion for facilitating the retaining segment engaged with the concave portion to depart from the concave portion so as to disassemble the member portions of the main body.

16. The shrinkable dispensing container of claim 15, wherein a track is further provided on the member portion adjacent to the access opening and a groove is provided on the corresponding member portion so that when the member portions are assembled through the track and the corresponding groove, the member portion having the track is easily coupled with the corresponding member portion having the groove.

17. A shrinkable dispensing container for probe covers of an ear thermometer of an ear thermometer, each of the probe covers of an ear thermometer having a hollow body and an annular flange and the shrinkable dispensing container comprises:

a main body for accommodating the probe covers stacked together and an access opening formed at one end of the main body for allowing an ear thermometer probe to insert into an upmost probe cover among the probe covers in the main body;

characterized in that:

a bottom portion is formed at another end of the main body opposite to the access opening for supporting all the probe covers stacked within the main body; and the main body is primarily composed of a plurality of member portions telescoped mutually and each of the member portions has a specific rough surface so that when the main body receives a compressing force acting along a lengthwise direction thereof, a friction is generated due to a relative movement of the rough surfaces of two member portions so that the member portion positioned inside and the member portion positioned outside can be mutually positioned due to the friction.

\* \* \* \* \*